United States Patent [19]

Murata et al.

[11] Patent Number: 4,643,684

[45] Date of Patent: Feb. 17, 1987

[54] MAGNETIC DISPLAY PANEL

[75] Inventors: Yasuzo Murata; Hiroshi Sato, both of Kanagawa, Japan

[73] Assignee: Pilot Man-Nen-Hitsu Kabushiki Kaisha, Tokyo, Japan

[21] Appl. No.: 238,794

[22] Filed: Feb. 27, 1981

[30] Foreign Application Priority Data

Feb. 28, 1980 [JP] Japan ................................. 55-24486

[51] Int. Cl.$^4$ ............................................... B43L 1/12
[52] U.S. Cl. .................................... 434/409; 428/117;
428/119; 428/900; 346/21
[58] Field of Search ............................ 346/21; 434/409

[56] References Cited

U.S. PATENT DOCUMENTS 3,938,263  2/1976  Tate ..................................... 434/409
4,143,472  3/1979  Murata et al. ....................... 434/409

FOREIGN PATENT DOCUMENTS 2034640  6/1980  United Kingdom ................. 434/409

Primary Examiner—Harland S. Skogquist
Attorney, Agent, or Firm—Sughrue, Mion, Zinn, Macpeak and Seas

[57] ABSTRACT

A magnetic display panel in which syneresis is completely eliminated between a colorant and a dispersion medium by the simultaneous use of organic and inorganic thickener. A liquid sealing space is provided between two substrates sealed by an adhesive in which space a dispersing liquid having a yield value of at least 5 dyne/cm$^2$ is filled. The dispersing liquid is composed of fine magnetic particles, a colorant, a dispersion medium and the organic and inorganic thickeners. The organic thickener is preferably one of olefinic polymer, olefinic copolymer, wax, metal soap and dextrin fatty acid ester while inorganic thickener is preferably one of fine powder silicic acid and fine powder silicate.

16 Claims, 11 Drawing Figures

MAGNETIC DISPLAY PANEL

BACKGROUND OF THE INVENTION

1. Field of the Invention

The present invention relates to a magnetic display panel that uses magnetic force to form a clear record display and to erase the display.

2. Description of the Prior Art

A conventional technique of forming a display using magnetic force uses the application of a magnetic field to a dispersion system having fine magnetic particles dispersed in a colored liquid dispersion medium so as to cause the fine particles to migrate and change the color of the dispersion system. According to this technique, a magnetic field is applied with a magnetic pen to a dispersion system composed of a dispersion medium colored with a dye or pigment in which is dispersed fine magnetizable particles of a color different from that of the dispersion medium. The degree by which the migrating particles are shielded by the dispersion medium is varied to change the color of the dispersion system.

This technique unfortunately suffers from the following defects. With the dispersion system sealed between two opposing substrates, when a magnetic pen is moved over the surface of one substrate to apply a magnetic field to the dispersion system, the magnetizable fine particles are attracted to scanned areas of that substrate to form a letter or pattern that follows the locus of the pen. However, ones of the attracted particles having a specific gravity much greater than that of the dispersion medium precipitate away from the display surface with the lapse of time making it impossible to retain the letter or pattern over an extended period of time. Another defect lies in the fact that all magnetic particles within the influence of the magnetic field of the magnetic pen are attracted to the pen and hence even particles quite remote in distance from the pen are attracted thereby forming a greatly blurred display of letter or pattern.

If the precipitation of magnetic fine particles is prevented by using micro-fine particles or by coating the particles with a sufficient amount of a resin of low specific gravity to bring the apparent specific gravity of the particles close to that of the dispersion medium, the magnetic force acting on the magnetic particles is decreased to such a level that they become less attractable by the magnetic pen and fail to form a letter or pattern of high contrast and tone. In addition, letters or patterns formed with such particles are difficult to erase, because the particles are not easily attracted to the rear substrate even if a relatively strong magnetic field is applied to that substrate. After repeated recording and erasure operations, the fine magnetic particles tend to remain suspended in the dispersion system thereby darkening the system. This also makes the desired display and erasure characteristics unobtainable.

For the reasons set forth, no magnetic display panel had been commercially produced before the present inventors developed the display panel disclosed in U.S. Pat. No. 4,143,472 issued on Mar. 13, 1979. The magnetic display panel therein disclosed has two substrates between which are confined a dispersing liquid having a yield value of 5 dyne/cm$^2$ or more and which is composed of fine magnetic particles, a dispersion medium, a fine particulate thickener, and a colorant.

As described above, a magnetic display panel using a dispersion system having fine magnetic particles dispersed in a colored liquid dispersion medium has serious defects. The concept of the invention disclosed in the referenced U.S. patent is based on our finding that a magnetic display panel using a dispersing liquid having a yield value of 5 dyne/cm$^2$ or more prepared by incorporating a fine particulate thickener in a dispersing colored liquid having fine magnetic particles dispersed in a dispersion medium provides a sharp display of high contrast. The display remains stable over an extended period of time and can be erased completely whenever necessary.

To maintain fine magnetic particles of high specific gravity in given positions in a liquid dispersion and to move the particles all at once upon application of a magnetic field, neither the control of the viscosity of the liquid dispersion nor the use of a dispersion stabilizer or protective colloid nor making the specific gravity of the dispersion medium equal to that of the magnetic particles is sufficient. The desired result can only be obtained with a dispersing liquid having a certain critical range of yield value. Our continued studies have revealed that such a result is obtainable with a dispersing liquid the yield value of which is controlled to be not less than 5 dyne/cm$^2$ using a fine particulate thickener. If the yield value of the dispersing liquid is less than 5 dyne/cm$^2$, not only is an indistinct display produced but also the fine magnetic particles rapidly precipitate after the display is formed. As a result, the displayed patterns may be indistinct or entirely illegible, and moreover will fade out with time. Such a drawback is most conspicuous when a dispersing liquid having a yield value of 0 dyne/cm$^2$, that is, when no fine particulate thickener is used. The problem is reduced as the yield value is increased by the addition of a fine particulate thickener. Only when the dispersing liquid has a yield value of 5 dyne/cm$^2$ or more is a magnetic display panel free from the defects mentioned above obtained. Therefore, it is critical to the invention of U.S. Pat. No. 4,143,472 that the dispersing liquid used have a yield value of 5 dyne/cm$^2$ or higher.

The term "yield value" as used in that patent and herein means the lowest stress required to cause a liquid to flow. This is indicated by the stress at point A in the flow curve shown in FIG. 1.

During the fabrication of a display panel, various foreign matter very often enters the liquid dispersion. Typical of such foreign matter is an adhesive which can dissolve in the liquid dispersion and cause a change in its yield value. Other sources of foreign matter are the front and rear substrates, a multicell plate, deposits on such objects, and dust and dirt present at the fabrication site. Preventing the entrance of such foreign matter has proven to be very difficult. Such foreign matter is the cause of a lowering of the yield value of the dispersing liquid. If such matter is present, a dispersing liquid, although it may have an initial yield value of 5 dyne/cm$^2$ or more, can no longer retain that level after it is confined in a panel thereby rendering the resulting panel inoperative.

As a result of various efforts to locate the cause of the decrease in the yield value of the dispersing liquid in a panel to below 5 dyne/cm$^2$ and to provide a device or method for preventing such a decrease, the present inventors have found that a selected organic thickener has the effect of preventing the decrease in the yield value of the liquid dispersion that accompanies the entrance of foreign matter in the dispersion during the fabrication of a display panel.

The use of a selected organic thickener prevents variation in the yield value presumably because it is less susceptible to the presence of an adhesive agent or other foreign matter dissolved in the liquid dispersion.

SUMMARY OF THE INVENTION

We have continued our studies and found that there is no occurrence of syneresis (phase-separation) between the colorant and dispersion medium when both organic and inorganic thickeners are used simultaneously as a thickener.

More specifically, with a view of overcoming drawbacks enumerated above, the present invention provides a magnetic display panel including a liquid containing panel having a front substrate which is transparent or at least translucent and arranged opposite a rear substrate and bonded thereto by an adhesive agent to make a liquid sealing space between said two substrates. A dispersing liquid having a yield value of 5 dyne/cm$^2$ or more is sealed in this space. The dispersing liquid is composed of at least one compound of organic thickener selected from the group consisting of an olefinic polymer, olefinic copolymer, wax, metal soap, and dextrin fatty acid ester, at least one compound of inorganic thickener selected from the group consisting of a fine powder silicic acid and fine powder silicate, fine magnetic particles, a colorant and a dispersion medium. Display of an image or pattern is effected with a movable marking device which produces an oriented magnetic field.

As used herein, the term "syneresis" refers to a phase separation between the dispersion medium and the magnetic particles, thickener and colorant such that a layer containing substantially only the dispersion medium collects in a region adjacent to and parallel to the front or rear substrate. When syneresis occurs, it is possible to write upon the panel by applying a magnetic field to attract the magnetic particles into the syneresis region. However, the panel cannot be entirely erased from this state due to what is termed "stagnation". By "stagnation" is meant a phenomenon whereby a V or U shaped phase-separation region is formed between the two substrates. Specifically, when syneresis is present, during the erasure of the panel, a stagnation region is formed between the substrates with the broader part of the region extending from the region of syneresis. The presence of the stagnation region makes the panel difficult to erase completely.

DESCRIPTION OF THE PREFERRED EMBODIMENTS

Figure 1:
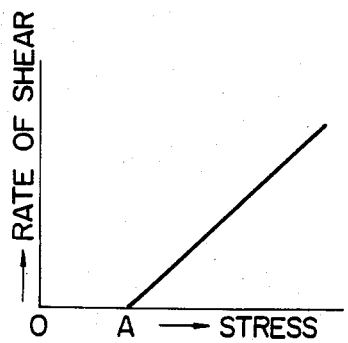
FIG. 1 is a graphical representation of the relation between the rate of shear and shear stress for illustrating the yield value of a liquid dispersion used in the magnetic display panel of this invention.

In a magnetic display panel according to the present invention, a display is formed by attraction and precipitation of magnetic particles in a dispersing liquid colored by a colorant. Accordingly, it is necessary that the colorant be uniformly dispersed in the dispersing liquid. If the uniform dispersion of the colorant is upset, syneresis may result between the colorant and the dispersion medium in the dispersing liquid thus causing separation or stagnation of the dispersion medium. If the dispersion medium is stagnated, the magnetic particles are difficult to shield because the dispersion medium is then transparent. Thus, the shielding effect produced by the colorant will be reduced and, as a result, the desired change in the color of the liquid dispersion cannot take place. All of these phenomena are detrimental to the proper functioning of the magnetic display panel.

Through further studies, we have found that the syneresis problem mentioned above is caused when the organic thickener is used as a thickener and the display is formed by the attraction and precipitation of the magnetic particles. Furthermore, as a result of various efforts to prevent such a syneresis problem, we have found that the simultaneous use of a selected organic thickener and selected inorganic thickener has the effect of maintaining the uniform dispersion of the colorant in the dispersing liquid and preventing syneresis between the colorant and the dispersion medium during the attraction and precipitation of the magnetic particles.

Examples of the organic thickener used in the present invention are an olefinic polymer, an olefine copolymer, wax, metal soap and a dextrin aliphatic acid ester. Examples of the olefinic polymer include polyethylene, low-molecular polyethylene, polypropylene and low-molecular polypropylene. Examples of the olefine copolymer include ethylene-vinyl acetate copolymer, ethylene-ethyl acrylate copolymer and ethylene-unsaturated organic acid copolymer. Examples of the inorganic thickener are fine powder silicic acid and fine powder silicate such as silicic anhydride, hydrated silicic acid, hydrated calcium silicate, hydrated aluminum silicate, silica powder, diatomaceous earth, kaolin, hard clay, soft clay, bentonite and organic bentonite. If desired, two or more of the organic thickener may be combined with one or more of the inorganic thickener.

The organic and inorganic thickeners can be blended in appropriate proportions under the condition that they are simultaneously in the dispersing liquid. However, if the inorganic thickener is within 20–80 wt% of the total amount of the thickener, it is possible to prevent variations in the yielding value of the dispersing liquid and to prevent syneresis between the colorant and the dispersion medium.

With respect to the amount of the thickener, it is possible to provide a dispersing liquid having a yield value of 5 dyne/cm$^2$ by adding 0.3 wt% or more thereof per 100 wt% of the dispersion medium.

Examples of suitable fine magnetic particles which can be used in this invention include magnetic oxide materials such as black magnetite, gamma-hematite, chromium dioxide and ferrite as well as fine magnetic particles having a low coercive force of magnetic metal materials made of alloys based on, for example, iron, cobalt or nickel, and granulated forms of these materials. If necessary, these fine particles may be adjusted for their color tone. The optimum size of the magnetic particles is 10 microns or more although particles having a size of less than 10 microns are also applicable. Such smaller particles provide an advantageous result since they tend to agglomerate in a dispersion liquid to give an apparent diameter of 10 microns or more.

Granulation of fine magnetic particles to such an extent that they will form agglomerates having an apparent size in a specified range by blending them with a resin solution followed by either drying and grinding or spraying and drying is preferred because grinding provides an increased motility of the particles upon application of a magnetic field and provides a sharper display. The solid content of the resin used in such granulation should not exceed 40 wt% of the amount of the fine magnetic particles and preferably should not exceed 30 wt% of the amount of the fine magnetic particles. The granulated fine magnetic particles are also referred to as fine magnetic particles herein.

The dispersion medium used may be a polar type such as water or a glycol or a non-polar type such as organic solvents or oils. Paraffinic solvents have been found to provide particularly good results.

The space between the two substrates which enclose the dispersion may be varied according to the specific application to which the display panel is put. However, for providing a sharp display with high contrast and for providing good erasure capability, the substrates may be spaced by a distance of from 0.5 to 20 mm, preferably from 0.5 to 2.0 mm. The amount of the fine magnetic particles in the dispersion liquid is preferably 10 parts or more per 100 parts of the dispersion medium. A smaller amount is not sufficient for magnetic particles to cover every part of the locus of a magnetic pen when they are attracted to either substrate over which the pen is moved to draw a letter or pattern resulting in a very poor display having discontinuous, broken lines.

The front substrate from which the display is read is preferably made of a transparent material but, depending on the particular application, it may be made of a translucent material. In either case, a variety of different plastics and glass can be employed. The other or rear substrate need not necessarily be made of a transparent material and hence a wide variety of plastics, glass and metals can be used. These plastics and glass may or may not be colored as desired. The advantages of colored plastics or glass are that a high contrast is produced between the substrate and magnetic particles and, secondly, a sharp display is produced even if light is shone on the rear side.

The substrates are bonded to each other by an adhesive agent selected from an epoxy adhesive, polyurethane adhesive, polyvinyl acetate adhesive, polyvinyl chloride adhesive, polyester adhesive, acrylic adhesive and synthetic rubber adhesive.

Color is used to provide the liquid dispersion with shielding properties and a color tone to increase the contrast between the color of the display formed by the fine magnetic particles and the background. Suitable colorants are white pigments and other pigments and dyes. A white pigment is most effective for providing a high contrast although pigments or dyes of any desired color may be employed. The use of less than 10%, preferably less than 3%, of the colorant on the basis of the liquid dispersion yields a sufficient increase in contrast between the dispersion and the fine magnetic particles to form a sharp display. If too much colorant is used, the display formed by the fine magnetic particles becomes less distinct.

The arrangement of multiple independent small cells between two substrates provides a uniform distribution of magnetic particles in the liquid dispersion between the substrate. Magnetic particles having a greater specific gravity than the dispersion medium have a tendency to be congregate locally in the dispersion. This tendency may be increased in a magnetic display panel of the invention to thereby form a less distinct display because a magnet is used to perform the display and erase operations. To avoid this difficulty, multiple independent cells can be provided between the substrates by placing a multicell plate having a plurality of through holes between the two substrates or by providing one of the substrates with cavities and bonding it tightly to the other substrate. The liquid dispersion confined in one cell will not migrate into an adjacent cell thereby eliminating the effects of uneven distribution of magnetic particles within the dispersion. Moreover, the multicell structure provides a higher contrast and the multicell plate keeps the front substrate spaced by a constant distance from the rear substrate. The cross section of each cell may be circular or polygonal. The thinner the wall that separates one cell from another, the better the continuity of the display that is obtained. The partition wall preferably has a thickness of less than 0.5 mm. To completely prevent leakage of the liquid dispersion, the edges of the two substrates are bonded to each other.

The marking tool used with the invention display panel is a movable marking device having an oriented magnetic field composed either of a permanent magnet or an electromagnet. Such a marking tool is used to perform both display and erase functions since both functions are performed by moving the fine particles with a magnetic field.

Figure 2:
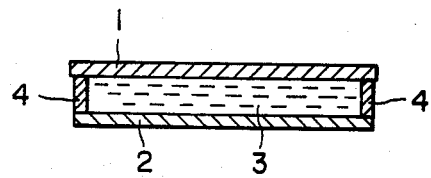
FIGS. 2 to 6 are sectional views showing five embodiments of the magnetic display panel of this invention.
Figure 3:
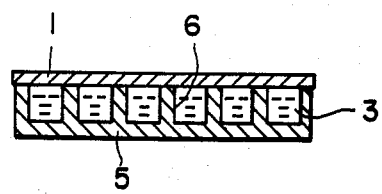
Figure 4:
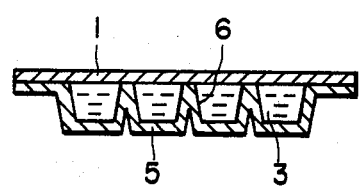
Figure 5:
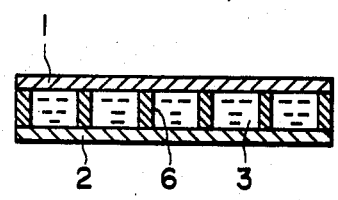
Figure 6:
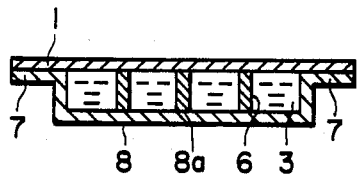

Referring to FIG. 2, a magnetic display panel is shown which includes a transparent front substrate 1 and a rear substrate 2 having confined therein a dispersing liquid 3 as described above by an adhesive 4 applied to the margical edges of the two substrates. FIG. 3 shows a magnetic display panel which uses a multicell plate 5 having a substrate integrally formed with partition walls to form independent cells 6. After the dispersing liquid 3 is placed in the individual cells, the multicell plate 5 is bonded to a substrate 1. In this magnetic panel, the substrate 1 may be used either as the front or rear substrate. FIG. 4 shows a magnetic display panel utilizing a substrate 5 having cavities formed therein. After the dispersing liquid 3 is placed in each cavity, the substrate 5 is bonded to a substrate 1 by an adhesive. FIG. 5 shows a magnetic display panel constructed with a multicell plate 6 having a number of independent cells in the form of through holes and which is bonded to a rear substrate 2. After the dispersing liquid 3 is placed in each cell, a front substrate 1 is bonded to the multicell plate 6. FIG. 6 shows another type of magnetic display panel which uses a cup-shaped substrate 8 having a marginal portion 7 around its periphery and a recess 8a in the center. A multicell plate 6 of the same construction as shown in FIG. 5 is placed in the recess and the dispersing liquid 3 is put in the cells of the plate 6. Thereafter, a substrate 1 is dispersed in the open mouth of the substrate 8 and the marginal portion 7 and is bonded to the substrate 1 by an adhesive. In this magnetic panel, the substrate 1 may be used either as the front or rear substrate.

Figure 7:
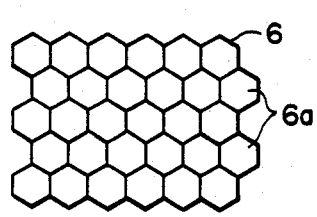
FIGS. 7 to 11 are partial plan views showing the multicell structures used in the magnetic display panel of this invention.
Figure 8:
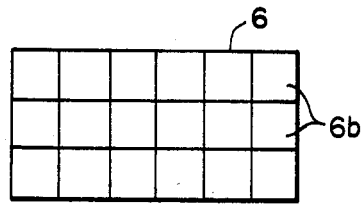
Figure 9:
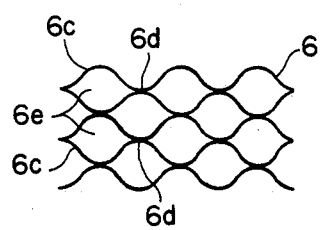
Figure 10:
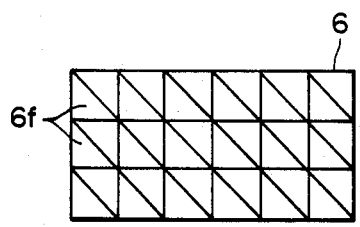
Figure 11:
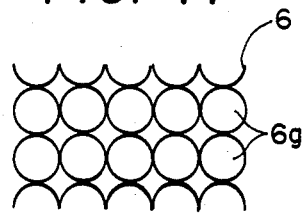

The multicell structure 6 shown in FIGS. 2 to 6 may be constituted of honeycomb cells 6a as shown in FIG. 7 or cells 6b having a rectangular cross section as shown in FIG. 8. Alternatively, as shown in FIG. 9, corrugated plates 6c may be piled one on another in such a manner that the protruding portions 6d of an adjacent corrugated plate 6c thereby form cells 6e having a spindle-shaped cross section. The multicell plate 6 can also be constituted by cells 6f having a triangular cross section as shown in FIG. 10 or cells 6g having a circular cross section as shown in FIG. 11.

With the magnetic display panel thus formed, to erase a display an erasure permanent magnet or an erasure electromagnet through which a current is passed is moved over the surface of the rear substrate to impose upon the dispersing liquid a magnetic field that causes the magnetic particles in the liquid to be attracted to the rear side. After the erasure operation, a magnetic pen equipped with a permanent magnet may be moved on the front substrate or a magnetic stamp brought into contact with the substrate whereupon the magnetic particles in the dispersing liquid that have been attracted to the rear side are selectively attracted to the front side in accordance with the locus of the magnetic pen or stamp to produce a contrast in the dispersing liquid and to thereby produce the desired display.

Repeating the above procedures, display and erasure of a recorded image on the magnetic display panel can be effected as many times as one likes. Examples of other applicable methods or devices are to effect recording by applying a current through a pen-shaped electromagnet instead of a pen-shaped permanent magnet, a method which recording is effected by applying a current through a magnetic head, a printing device that uses a permanently magnetized plate having patterns such as geometrical figures or letters of such a plate magnetized by an electromagnet, a pen-shaped magnet that is modelled after a Japanese writing brush formed as an assembly of hairs of magnetic material, and a recording device that combines a magnetic pattern made of a material which possesses a magnetic shielding effect with a permanent magnet or an electromagnet.

A displaying magnetic panel may be fabricated by confining a liquid dispersion of the fine magnetic particles in cells arranged to provide picture elements, for example, a seven segment alpha-numeric display, cells arranged from a dot matrix, or cells arranged in character or geometrical patterns.

To erase the display on the magnetic panel, a permanent erasure magnet or an erasure electromagnet through which a current is passed is moved over the surface of the front substrate to attract the magnetic particles to the front side in a desired image pattern. Afterwards, a recording head on the rear substrate provided as a permanent magnet or an electromagnet is operated to apply a magnetic field to the dispersing liquid to return some of the magnetic particles to the rear side thereby changing only the color of the picture elements. Repeating this procedure, display and erasure of a record on the magnetic panel can be effected as many times as one wishes.

The foregoing description assumes separate display and erase tools but it should be understood that two functions can be performed by a single tool if desired.

The magnetic display panel of the invention is very useful since it has many applications such as toys for infants, teaching equipment, writing boards, various game boards, record display boards, memorandum boards, blackboards, whiteboards, POP boards, and the like. It can even be used for underwater record displaying boards since one advantage of the panel of this invention is that it is inherently waterproof and no liquid ink or water-soluble writing material is used.

Several examples of a magnetic display panel of the invention will be described below. However, it should be understood that the invention is not limited to such examples. In the examples, all specified parts are by weight.

EXAMPLE 1

Ninety-seven parts of Isopar M (the trade name for an isoparaffin solvent of Humble Oil & Refining Co.) were mixed with three parts of A-C Polyethylene #9 (the trade name for a low molecular polyethylene of Allied Chemical Corp., U.S.A.), and the mixture was melted and cooled to provide a dispersing liquid sample A. A dispersing liquid sample B was prepared by dispersing 2.5 parts of Aerosil-200 (the trade name for a fine powder silicic acid of Nippon Aerosil K.K.) in 97.5 parts of Isopar M. A mixture of 80 parts of sample A, 80 parts of sample B and 1.6 parts of Tipaque CR-50 (the trade name for titanium oxide of Ishihara Sangyo K.K.) was kneaded in a homogenizer (a wet type disperser of Nihonseiki Kaisha Ltd.) to prepare a white dispersing liquid.

A mixture of 90 parts of Toda Color KN-320 (the trade name for a magnetite of Toda Kogyo K.K.) and 25 parts of 40% methyl ethyl ketone solution of Epo-Tohto YD-017 (the trade name for a solid epoxy resin of Toto Kasei K.K.) was kneaded, dried, ground and classified to form 40 parts of black magnetic grains of 100–325 mesh. The magnetic grains were dispersed in the previously prepared white dispersion medium to form a dispersing liquid. The dispersing liquid has a yield value of 20.2 dyne/cm$^2$ when measured with a Brookfield visometer by the direct method.

Then, a multicell plate 1.0 mm thick was prepared which had discrete cells in the form of through-holes. The sectional area of each cell was 4 mm square. A plastic film 0.1 mm thick was bonded to the multi-cell plate with an adhesive and the dispersing liquid was put in the cells. Then, another plastic film 0.1 mm thick was bonded to the other side of the multi-cell plate with an adhesive to thereby form a magnetic display panel. The adhesive was a mixture of Adeka-Resin EP 4000 (the trade name for an epoxy resin of Asahi Electro-Chemical Co., Ltd.) and Anchor 1170 (the trade name for a curing agent of Anchor Chemical Corp., U.K.).

EXAMPLE 2

A magnetic display panel was prepared in the same manner as in Example 1 except for the following points: a dispersing liquid sample A was prepared by melting and cooling a mixture of 95.5 parts of Isopar M and 4.5 parts of DPDJ 9169 (the trade name for an ethylene-ethyl acrylate copolymer of Nippon Unikar Co., Ltd.); a dispersing liquid sample B was prepared by dispersing 2.5 parts of Aerosil-200 in 97.5 parts of Isopar M; a white dispersing liquid was prepared from a mixture of 80 parts of dispersing liquid sample A, 80 parts of dispersing liquid sample B, and 1.6 parts of Tipaque CR-50; and 40 parts of magnetic grains were dispersed in the white dispersing liquid to prepare a dispersing liquid. The dispersing liquid had a yield value of 17.5 dyne/cm$^2$.

EXAMPLE 3

A magnetic display panel was prepared in the same manner as in Example 1 except for the following points; a dispersing liquid sample A was prepared by melting and cooling a mixture of 96.5 parts of Isopar M and 3.5 parts of Hoechst Wax OP (the trade name for a partially saponified ester wax of Hoechst Japan Ltd.); a dispersing liquid sample B was prepared by dispersing 2.5 parts of Aerosil-200 in 97.5 parts of Isopar M; a white dispersing liquid was prepared from a mixture of 80 parts of sample A, 80 parts of sample B, and 1.6 parts of Tipaque CR-50; and 40 parts of magnetic grains were dispersed in the white dispersing liquid to prepare a dispersing liquid. The dispersing liquid had a yield value of 26.4 dyne/cm$^2$.

EXAMPLE 4

A magnetic display panel was prepared in the same manner as in Example 1 except for the following points; a dispersing liquid sample A was prepared by cooling a molten mixture of 97 parts of Isopar M and 3 parts of aluminum stearate; a dispersing liquid sample B was prepared by dispersing 2.5 parts of Aerosil-200 in 97.5 parts of Isopar M; a white dispersing liquid was prepared from a mixture of 80 parts of sample A, 80 parts of sample B, and 1.6 parts of Tipaque CR-50; and 40 parts of magnetic grains were dispersed in the white dispersing liquid to prepare a dispersing liquid. The dispersing liquid had a yield value of 29.1 dyne/cm$^2$.

EXAMPLE 5

A magnetic display panel was prepared in the same manner as in Example 1 except for the following points: a dispersing liquid sample A was prepared by melting and cooling a mixture of 94 parts of Isopar M and 6 parts of Leopar KE (the trade name for a dextrin aliphatic acid ester of Kaihatsu Kagaku K.K.); a dispersing liquid sample B was prepared by dispersing 2.5 parts of Aerosil-200 in 97.5 parts of Isopar M; a white dispersing liquid was prepared from a mixture of 80 parts of sample A, 80 parts of sample B, and 1.6 parts of Tipaque CR-50; and 40 parts of magnetic grains were dispersed in the white dispersing liquid to prepare a dispersing liquid. The dispersing liquid had a yield value of 15.4 dyne/cm$^2$.

EXAMPLE 6

A magnetic display panel was prepared in the same manner as in Example 1 except that the adhesive used was a mixture of Adeka Resin UP 302 (the trade name for a urethane polymer produced by Asahi Electro-Chemical Co., Ltd.) and Adeka Resin CA-128 (the trade name for a curing agent provided by Asahi Electro-Chemical Co., Ltd.).

EXAMPLE 7

A magnetic display panel was prepared in the same manner as in Example 2 except that the adhesive used was a mixture of 25 parts of DENKA vinyl #1000A (the trade name for vinyl chloride-vinyl acetate copolymer produced by Denki Kagaku Kogyo Co., Ltd.) and 75 parts of cyclohexanone.

EXAMPLE 8

A magnetic display panel was prepared in the same manner as in Example 3 except that the adhesive used was a mixture of 20 parts of Vilon (the trade name for polyester resin produced by Toyobo Co., Ltd.) and 80 parts of methyl ethyl ketone.

EXAMPLE 9

A magnetic display panel was prepared in the same manner as in Example 4 except that the adhesive used was ARON S-623 (the trade name for polyacrylic ester solution produced by Toagosei Chemical Co., Ltd.).

EXAMPLE 10

A magnetic display panel was prepared in the same manner as in Example 5 except that the adhesive used was a mixture of 10 parts of JSR PN30A (the trade name for acrylonitrile-butadiene rubber produced by Japan Synthetic Rubber Co., Ltd.) and 90 parts of methyl ethyl ketone.

EXAMPLE 11

A magnetic display panel was prepared in the same manner as in Example 1 except for the following points: a mixture of 98.2 parts of Isopar M and 1.8 parts of aluminum tristearate was heated in solution and then cooled to form a dispersing liquid sample A; a mixture of 95.8 parts of Isopar M and 4.2 parts of Aerosil-200 was dispersed to form a dispersing liquid sample B; and a mixture of 80 parts of the dispersing liquid A and 1.6 parts of Tipaque CR-50 was homogenized to produce a white dispersing liquid. The dispersing liquid had a yield value of 11.0 dyne/cm$^2$.

Several comparative examples will be described below.

COMPARATIVE EXAMPLE 1

A mixture of 98 parts of Isopar M, 1.77 parts of Aerosil-200 and one part of Tipaque CR-50 was kneaded with a T.K. homomixer (a wet type dispersing machine manufactured by Tokushukika Kogyo K.K.) until a white liquid was obtained.

40 parts of Toda Color KN-320 were blended with 25 parts of a 40% methyl ethyl ketone solution of Epo-Tohto YD-017 and the blend was dried, ground and classified to produce 30 parts of fine black magnetic particles of 100–325 mesh. The dispersing liquid had a yield value of 12.0 dyne/cm$^2$.

A multicell plate 1.0 mm thick having cells formed as independent through-holes with a square cross section of 4×4 mm was sandwiched between the plastic films each 0.1 mm thick and fixed with an adhesive. The previously prepared dispersing liquid was disposed in the cells to form the magnetic display panel. The adhesive was a mixture of Adeka Resin EP 4000 and Anchor-1170.

COMPARATIVE EXAMPLE 2

A magnetic display panel was prepared in the same manner as in Comparative Example 1 except for the following points: a mixture of 96.2 parts of Isopar M and 3.8 parts of DPDJ 9169 was heated in solution and then cooled to form a dispersing liquid. Further, a mixture of the dispersing liquid and one part of Tipaque CR-50 was kneaded with a homogenizer until a white dispersing liquid was obtained. The dispersing liquid had a yield value of 13.0 dyne/cm$^2$.

Tests were conducted to compare the performance of the magnetic panel prepared in Examples 1 to 11 and those of the magnetic panel prepared in Comparative Examples 1 and 2. The factors observed, which are listed below in the Table, were the sharpness of display, amount of adhesive dissolved in the dispersion, and the amount of variation in the yield value of the dispersion.

|  | Sharpness of display | Amounts of adhesive dissolved into liquid dispersion | Variation in the yield value of liquid dispersion | Existence of syneresis |
|---|---|---|---|---|
| Example No. | | | | |
| 1 | sharp | large | small | none |
| 2 | " | " | " | " |
| 3 | " | " | " | " |
| 4 | " | " | " | " |
| 5 | " | " | " | " |
| 6 | " | " | " | " |
| 7 | " | " | " | " |
| 8 | " | " | " | " |
| 9 | " | " | " | " |
| 10 | " | " | " | " |
| 11 | " | " | " | " |
| Comparative Example No. | | | | |
| 1 | slightly blurred | large | large | yes |
| 2 | sharp but not sharp in erasing | " | small | yes |

The tests were conducted as follows. First, the yield value of each dispersing liquid was measured and the dispersing liquid disposed in a test panel. Then, recording was made on the panel with a magnet, and the panel was visually examined for the sharpness of the display and also for whether or not there was any syneresis between the colorant and the dispersion medium during erasure. Subsequently, the dispersing liquid was taken out of the panel and examined to determine if any adhesive used in constructing the panel had dissolved in the dispersing liquid. The yield value of the dispersing liquid was compared with the value measured before confining it in the panel.

Measurement of the yield value was carried out by the direct method using a Brookfield BL viscometer (product of Tokyo Keiki K.K.). The method of measurement was as follows. The rotor of the viscometer was immersed in the dispersing liquid and only the dispersing liquid was allowed to move around the rotor at a very slow rate of 0.2 rpm without rotating the rotor. The spring of the rotor was turned to cause both the rotor and the dispersing liquid to turn. When the rotor had been turned through a certain angle, the dispersing liquid began to slide along the rotor. The angle of torsion of the rotor at the time when such slippage occurred was measured. The yield value was calculated from the angle of torsion of the rotor, the torsion constant of the spring of the rotor, and the configuration and area of the rotor. The conversion formulae used were as follows.

| Rotor Number | Yield Value |
|---|---|
| No. 1 rotor | $0.168\theta$ |
| No. 2 rotor | $0.840\theta$ |
| No. 3 rotor | $3.360\theta$ |

In the formulae, $\theta$ is the measured angle of torsion of the rotor.

The test results show that the dispersing liquid confined in each of the panels of Examples 1 to 11 experienced only a small variation in the yield value. For example, the dispersing liquid used in Example 11, which has an initial yield value of 11.0 dyne/cm$^2$, still had a value of 5 dyne/cm$^2$ after it was disposed in a panel. On the other hand, the dispersing liquid used in the Comparative Example 1 had a yield value of less than 2 dyne/cm$^2$ after it was disposed in a panel. Accordingly, the dispersing liquid used in the Comparative Example 1 did not have a yield value of 5 dyne/cm$^2$ or more than is essential to the invention and a magnetic display panel using such dispersing liquid was not commercially acceptable. Syneresis was lightly observed in Comparative Examples 1 and 2. Further, in the dispersing liquid used in each of the panels of Examples 1 to 11, the uniform dispersion of the colorant was not upset when erasing the display record, that is, when the magnetic particles previously attracted to the front substrate were precipitated. Accordingly, there is not caused a stagnation of the dispersion medium. As a result, the color change of the dispersion liquid could be completed. On the other hand, when erasing in the panel of Comparative Example 2, the uniform dispersion of the colorant was upset and accordingly, stagnation of the dispersion medium was caused. As a result, the magnetic particles existing in the stagnation could not be shielded because of the transparency of the dispersion medium. Thus, complete erasure of the display record could not be accomplished.

In summary, the magnetic display panel of the invention produced by utilizing a liquid dispersion having a yield value of 5 dyne/cm$^2$ or more which has simultaneously dispersed therein fine particles of an organic thickener and inorganic thickener achieved good results in each test and was concluded to be a very useful product.

What is claimed is:

1. A magnetic display panel comprising:
    a liquid containing panel having a front substrate formed of a material selected from the group consisting of transparent and translucent materials and a rear substrate disposed opposite to said substrate and bonded thereto by an adhesive, a liquid sealing space being formed between said substrate; and
    a dispersing liquid having a yield value of at least 5 dyne/cm$^2$ sealed in said space, said dispersing liquid comprising at least one organic thickener selected from the group consisting of olefinic polymer, olefinic copolymer, wax, metal soap and dextrin fatty acid ester, at least one inorganic thickener selected from the group consisting of fine powder silicic acid and fine powder silicate, fine magnetic particles having a low coercive force, a colorant and a dispersion medium, an image being recordable on said panel by a movable marking device having an oriented magnetic field.

2. The magnetic display panel according to claim 1 further comprising a multicell structure having a plurality of independent spaces disposed between said substrates and being bonded to said substrates by an adhesive.

3. The magnetic display panel according to claim 2 wherein said multicell structure comprises a plurality of honeycomb cores.

4. The magnetic display panel according to claim 1 or 2 wherein said fine magnetic particles having a low retention force comprise a material selected from the group consisting of black magnetite, gamma-hematite, chromium dioxide, ferrite, iron, cobalt and nickel including granulated particles thereof.

5. The magnetic display panel according to claim 1 or 2 wherein the movable marking device having an oriented magnetic field comprises one of a permanent magnet and an electromagnet.

6. The magnetic display panel according to claim 1 or 2 wherein said adhesive comprises an epoxy resin adhesive.

7. The magnetic display panel according to claim 1 or 2 wherein said adhesive comprises a polyurethane adhesive.

8. The magnetic display panel according to claim 1 or 2 wherein said adhesive comprises a vinyl adhesive.

9. The magnetic display panel according to claim 1 or 2 wherein said adhesive comprises a polyester adhesive.

10. The magnetic display panel according to claim 1 or 2 wherein said adhesive comprises an acrylic resin adhesive.

11. The magnetic display panel according to claim 1 or 2 wherein said adhesive comprises a synthetic rubber adhesive.

12. A magnetic display panel comprising:
a front substrate formed of a material selected from the group consisting of transparent and translucent materials and a rear substrate arranged opposite said front substrate, a liquid sealing space being formed between said substrates, said substrates being bonded together with an adhesive; and
a dispersing liquid having a yield value of at least 5 dyne/cm$^2$ disposed in said liquid sealing space, said dispersing liquid comprising fine magnetic particles, a colorant, a dispersion medium and a thickener, said thickener comprising an inorganic thickener and an organic thickener, display of an image being recordable on said panel by a movable marking device having an oriented magnetic field, wherein said organic thickener comprises an olefinic polymer.

13. A magnetic display panel comprising:
a front substrate formed of a material selected from the group consisting of transparent and translucent materials and a rear substrate arranged opposite said front substrate, a liquid sealing space being formed between said substrates, said substrates being bonded together with an adhesive; and
a dispersing liquid having a yield of at least 5 dyne/cm$^2$ disposed in said liquid sealing space, said dispersing liquid comprising fine magnetic particles, a colorant, a dispersion medium and a thickener, said thickener comprising an inorganic thickener and an organic thickener, display of an image being recordable on said panel by a movable marking device having an oriented magnetic field, wherein said organic thickener comprises a copolymer of an olefin and a monomer copolymerizable therewith.

14. A magnetic display panel comprising:
a front substrate formed of a material selected from the group consisting of transparent and translucent materials and a rear substrate arranged opposite said front substrate, a liquid sealing space being formed between said substrates, said substrates being bonded together with an adhesive; and
a dispersing liquid having a yield value of at least 5 dyne/cm$^2$ disposed in said liquid sealing space, said dispersing liquid comprising fine magnetic particles, a colorant, a dispersion medium and a thickener, said thickener comprising an inorganic thickener and an organic thickener, display of an image being recordable on said panel by a movable marking device having an oriented magnetic field, wherein said organic thickener comprises wax.

15. A magnetic display panel comprising:
a front substrate formed of a material selected from the group consisting of transparent and translucent materials and a rear substrate arranged opposite said front substrate, a liquid sealing space being formed between said substrates, said substrates being bonded together with an adhesive; and
a dispersing liquid having a yield value of at least 5 dyne/cm$^2$ disposed in said liquid sealing space, said dispersing liquid comprising fine magnetic particles, a colorant, a dispersion medium and a thickener, said thickener comprising an inorganic thickener and an organic thickener, display of an image being recordable on said panel by a movable marking device having an oriented magnetic field, wherein said organic thickener comprises metal soap.

16. A magnetic display panel comprising:
a front substrate formed of a material selected from the group consisting of transparent and translucent materials and a rear substrate arranged opposite said front substrate, a liquid sealing space being formed between said substrates, said substrates being bonded together with an adhesive; and
a dispersing liquid having a yield value of at least 5 dyne/cm$^2$ disposed in said liquid sealing space, said dispersing liquid comprising fine magnetic particles, a colorant, a dispersion medium and a thickener, said thickener comprising an inorganic thickener and an organic thickener, display of an image being recordable on said panel by a movable marking device having an oriented magnetic field, wherein said organic thickener comprises a dextrin fatty acid ester.

* * * * *